US009789380B2

(12) United States Patent
Jafarifesharaki

(10) Patent No.: US 9,789,380 B2
(45) Date of Patent: *Oct. 17, 2017

(54) SYSTEM AND METHOD FOR TRACKING FITNESS PROGRESS FROM A SERVER

(71) Applicant: Kiarash Jafarifesharaki, Irvine, CA (US)

(72) Inventor: Kiarash Jafarifesharaki, Irvine, CA (US)

(73) Assignee: FLEX BOOTH, INC., Irvine, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/199,925

(22) Filed: Mar. 6, 2014

(65) Prior Publication Data

US 2014/0289270 A1    Sep. 25, 2014

Related U.S. Application Data

(60) Provisional application No. 61/805,072, filed on Mar. 25, 2013.

(51) Int. Cl.
| | |
|---|---|
| A63B 69/00 | (2006.01) |
| G09B 9/00 | (2006.01) |
| A63B 71/00 | (2006.01) |
| G06F 17/30 | (2006.01) |
| H04L 29/06 | (2006.01) |
| H04L 29/08 | (2006.01) |
| G06Q 30/02 | (2012.01) |

(52) U.S. Cl.
CPC ........ *A63B 71/00* (2013.01); *G06F 17/30424* (2013.01); *H04L 63/08* (2013.01); *H04L 67/141* (2013.01); *H04L 67/42* (2013.01); *G06Q 30/0241* (2013.01); *H04L 67/12* (2013.01)

(58) Field of Classification Search
USPC ........................................................ 434/247
See application file for complete search history.

(56) References Cited

U.S. PATENT DOCUMENTS

| | | | |
|---|---|---|---|
| 7,039,486 | B2 | 5/2006 | Wang |
| 7,184,047 | B1 | 2/2007 | Crampton |
| 2003/0156199 | A1 | 8/2003 | Shindo et al. |
| 2004/0029684 | A1 | 2/2004 | Zarif |
| 2004/0120008 | A1 | 6/2004 | Morgan |
| 2007/0006579 | A1 | 1/2007 | Takada et al. |

(Continued)

FOREIGN PATENT DOCUMENTS

| | | |
|---|---|---|
| CN | 1179239 C | 2/2000 |
| KR | 20100012402 A | 2/2010 |

*Primary Examiner* — Kesha Frisby
(74) *Attorney, Agent, or Firm* — Jafari Law Group, Inc.

(57) ABSTRACT

The invention is generally a system that enables a user to visually and graphically track their fitness goals using an interactive device connected to a server, wherein fitness progress data of the user is stored and made available to the user via a user interface, for example on a mobile device application or a webpage. The system of tracking fitness progress comprises a server, a database, and a device, for example a fitness booth, for taking images and gathering fitness progress data from a user. The information gathered at the fitness booth, including images, is stored in the database. Users are provided a graphical user interface to update and access their fitness progress data, thereby facilitating the user's tracking of their fitness progress.

10 Claims, 10 Drawing Sheets

(56) References Cited

U.S. PATENT DOCUMENTS

| | | |
|---|---|---|
| 2009/0185727 A1 | 7/2009 | Beckmann et al. |
| 2009/0240528 A1 | 9/2009 | Bluth |
| 2009/0298650 A1* | 12/2009 | Kutliroff ............ A63B 71/0622 482/8 |
| 2012/0032349 A1 | 2/2012 | Haba et al. |
| 2012/0120257 A1 | 5/2012 | Corn et al. |
| 2012/0296455 A1 | 11/2012 | Ohnemus et al. |
| 2012/0300087 A1 | 11/2012 | Shore et al. |
| 2013/0070093 A1 | 3/2013 | Rivera et al. |
| 2013/0188063 A1 | 7/2013 | Cameron |
| 2014/0128691 A1 | 5/2014 | Olivier |

* cited by examiner

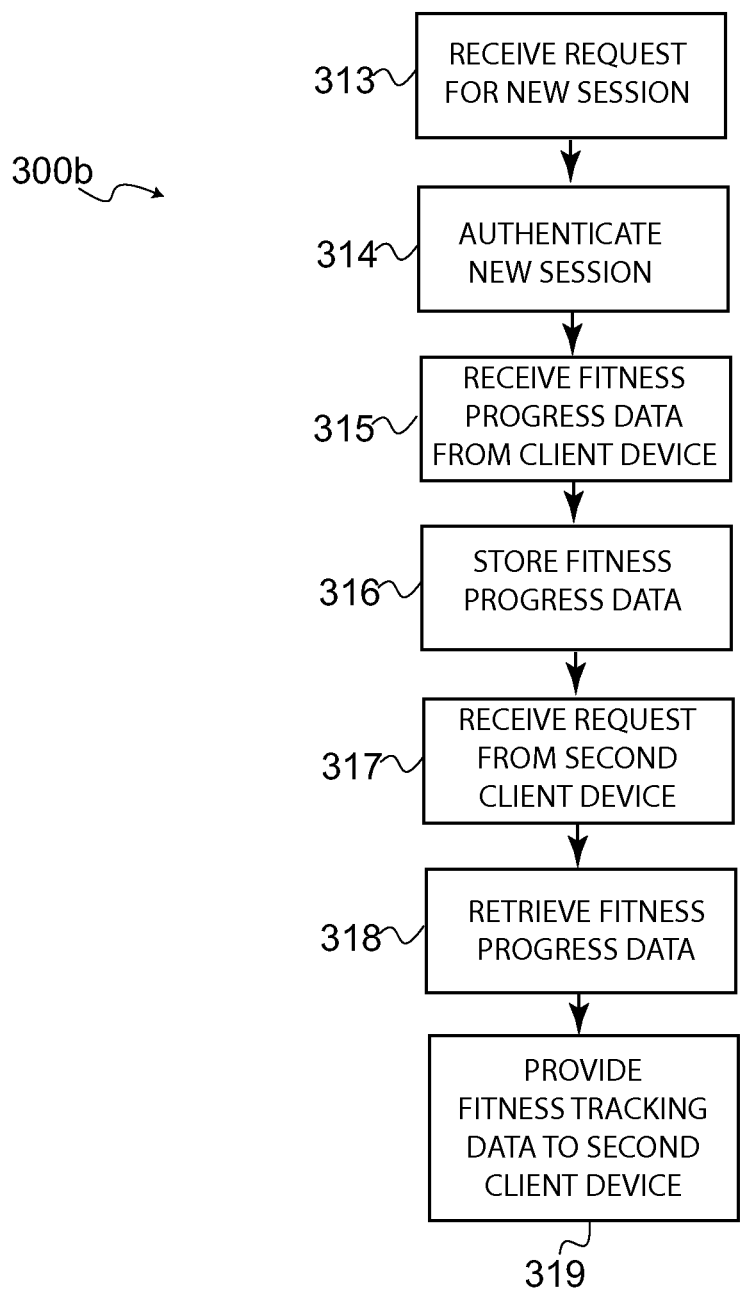

SYSTEM AND METHOD FOR TRACKING FITNESS PROGRESS FROM A SERVER

PRIORITY NOTICE

The present application claims priority under 35 U.S.C. §119(e) to U.S. Provisional Patent Application Ser. No. 61/805,072 filed on Mar. 25, 2013, the disclosure of which is incorporated herein by reference in its entirety.

TECHNICAL FIELD OF THE INVENTION

The present invention relates in general to a system and method for tracking fitness progress, and more specifically, a system that enables a user to visually and graphically track their fitness goals using an interactive photo booth connected to a server, wherein fitness progress data of the user is stored and made available to the user via a user interface, for example on a mobile device application or a webpage.

BACKGROUND OF THE INVENTION

Every year, millions of people across the world struggle with their fitness goals due to a lack of motivation. One of the key reasons for this lack of motivation is the inability to adequately recognize or monitor progress. Keeping track of fitness goals has always been a hassle, in part, due to the inconsistency and low compliance rates for recording visual and numerical data. When a gym member finishes a workout, they often wish they could take a picture of themselves. The period immediately following a workout is the highest point of motivation for a gym member, wherein the member wants to snap a self-photo to demonstrate progress to themselves and their friends and family. However, most people feel embarrassed about taking self-photos at the gym, or they simply don't have the time or patience to take each of the necessary pictures from the right distance, with the right lighting, and in the proper pose. Thus, gym members lose out on an important motivating force that could be the difference between continuing a workout regimen and giving up altogether. Therefore, there is a need in the art for a system and method for visually and graphically tracking fitness progress in private using a fast, interactive, gym-integrated photo booth. It is to these ends that the present invention has been developed.

SUMMARY OF THE INVENTION

To minimize the limitations in the prior art, and to minimize other limitations that will be apparent upon reading and understanding the present specification, the present invention describes a system and method for tracking fitness progress.

A system of tracking fitness progress in accordance with one embodiment of the present invention, comprises: a server connected to a network; a database, residing within the server, for storing a user's fitness progress data; a first client device connected to the network, comprising a user interface, and a processor for compiling the user's fitness progress data including one or more images, wherein the processor is configured to communicate the fitness progress data between the first client device and the server via a network interface; a compartment, for housing the first client device and one or more cameras for capturing the one or more images; and a graphical user interface for accessing the fitness progress data via a second client device.

A method for tracking fitness progress in accordance with practice of one embodiment of the present invention, comprises: receiving a request from a first client device for a new session with a server; requesting and receiving, from the first client device, a unique user identifier from a user; authenticating the new session by the server; presenting instructions to the user, via the first client device, the instructions designed to capture a fitness progress data from the user, the fitness progress data including one or more images of the user; capturing, via the first client device, the fitness progress data from the user, including capturing the one or more images of the user; sending, from the first client device to the server, the fitness progress data, including the one or more images of the user; receiving, by the server, the fitness progress data of the user; storing the fitness progress data in the server's memory; receiving a request from a second client device for the fitness progress data; authenticating the request from the second client device; providing a graphical user interface accessible by the second client device; and displaying, on the second client device, the fitness progress data via the graphical user interface.

A system for tracking a user's fitness progress, in accordance with another embodiment of the present invention, comprises: a server with a database for storing fitness progress data; a first client device for compiling the fitness progress data from a user, the first client device housed in a compartment with a user interface and one or more cameras; and a second client device, with access to a graphical user interface for displaying the fitness progress data, wherein the server is configured to: receive a request for a new session between the server and the first client device, authenticate the new session with the first client device in order to receive fitness progress data from the first client device, and provide the fitness progress data received from the first client device to the second client device upon receiving a request from the second client device for the fitness progress data, and the first client device is configured to: present instructions to a user, the instructions designed to capture a fitness progress data from the user, the fitness progress data including one or more images of the user, capture the fitness progress data from the user, including capturing the one or more images of the user, and send, to the server, the fitness progress data including the one or more images of the user.

A method for tracking fitness progress in accordance with practice of another embodiment of the present invention, comprises: receiving a request for a new session from a first client device housed within a compartment including a user interface, a camera, and a processor for compiling a fitness progress data, wherein the processor is configured for communicating the fitness progress data between the first client device and the server via a network interface; authenticating a communication session between the server and the first client device; receiving a fitness progress data of a user from the first client device, wherein the fitness progress data includes one or more images of the user; storing the fitness progress data in the server's memory; receiving a request from a second client device for the fitness progress data; and sending the fitness progress data to the second client device.

A server computer for tracking fitness progress of a user, in accordance with one embodiment of the present invention, comprises: a network interface for communicating with a first client device; a database for storing a user's fitness progress data received from the first client device; a processor configured to: receive a request for a new session from the first client device, the first client device comprising a user interface and a camera configured to compile a fitness progress data and communicating the fitness progress data to the processor, wherein the first device is housed within a compartment that includes a scale; establish a communication session between the processor and the first client device; receive the fitness progress data of a user from the first client device, wherein the fitness progress data includes one or more images of the user; store the fitness progress data in a memory connected to the processor; receive a request from a second client device for the fitness progress data; and send the fitness progress data to the second client device.

A method for tracking fitness progress from a client device, in accordance with practice of one embodiment of the present invention, comprises: providing a server with a unique identifier associated with a user; requesting, from the server, a fitness progress data of the user compiled by a fitness booth, wherein the fitness progress data comprises the user's weight, body mass index, and one or more photos of the user captured by the fitness booth; and displaying the fitness progress data compiled by the fitness booth via the client device.

A method for compiling fitness progress by a client device, in accordance with practice of one embodiment of the present invention, comprises: requesting and receiving a unique user identifier from a user; establishing communication with a server for storing a fitness progress data provided by the user; presenting instructions to the user via a user interface housed within a compartment including one or more cameras, the instructions designed to capture the fitness progress data from the user, the fitness progress data including one or more images of the user; capturing the fitness progress data including the one or more images of the user; and sending the fitness progress data to the server, in order to store the fitness progress data in a profile associated with the user.

A booth for compiling fitness progress data, in accordance with one embodiment of the present invention, comprises: one or more cameras for capturing one or more images of a user; a client computer configured to: request and receive a unique user identifier from the user in order to establish a communication between the client computer and a server; present instructions to the user designed to capture the fitness progress data from the user, the fitness progress data including one or more images of the user; capture the fitness progress data including the one or more images of the user; and send the fitness progress data to the server, in order to store the fitness progress data in a profile associated with the user.

A device for compiling fitness progress data, in accordance with one embodiment of the present invention, comprises: a network interface for establishing a user interaction session with a server, wherein the user interaction session includes providing the server with a fitness progress data of the user; a user interface for providing user instructions to obtain the fitness progress data from the user, the fitness progress data including one or more images of the user; one or more cameras for capturing the one or more images of the user; and a booth for housing the user interface and the one or more cameras, the booth adapted to provide the user with privacy during the user interaction session.

It is an objective of the present invention to allow a user to capitalize on the high fitness motivation levels while engaged at a fitness and health facility.

It is another objective of the present invention to provide a quick, easy way of documenting fitness progress while engaged at a fitness and health facility.

It is yet another objective of the present invention to extend post-workout motivation by allowing users to remotely view their fitness progress through employing graphical user interfaces such as web sites and mobile smart device apps.

It is yet another objective of the present invention to connect users around the world to remain motivated in their fitness goals and lifestyle by having their own user profile on a community page where users can share their data, rate and comment on other users data, and engage in competitions that award users for their fitness accomplishments.

It is yet another objective of the present invention to provide advisory and community forums for fitness booth users to gain helpful and pertinent fitness, diet, and health-related advice, tips, and suggestions.

It is yet another objective of the present invention to afford privacy to users while taking fitness progress photos.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 3(b) is a flowchart illustrating one method of tracking fitness progress from a server, in accordance with an exemplary embodiment of the present invention.

DETAILED DESCRIPTION OF THE DRAWINGS

In the following discussion that addresses a number of embodiments and applications of the present invention, reference is made to the accompanying drawings that form a part hereof, where depictions are made, by way of illustration, of specific embodiments in which the invention may be practiced. It is to be understood that other embodiments may be utilized and changes may be made without departing from the scope of the present invention.

The present system and method for tracking fitness progress utilizes a fitness booth with a private enclosure incorporated into a gym. This fitness booth sends and receives information pertaining to user profiles to and from a server. Users access their accounts through their respective user profile and thereafter interact with the fitness booth interface to compile information, for instance body weight, height, body mass index (BMI), body fat percentage, and photos taken by the fitness booth from various athletic and non-athletic poses. Users may share their profile information and fitness progress and goals with other fitness booth users and members of their social media circles. The present invention capitalizes on heightened motivation following a workout by providing a simple, convenient means to document fitness progress. A user may then subsequently analyze their progress remotely using other graphical user interfaces (GUIs) such as a website, mobile phone app, or more generally a mobile smart device, including but not limited to, a tablet or cell phone.

While the disclosure of a fitness booth in accordance with the present invention may refer to the fitness booth as being present within a gym, the term, gym, is not to be construed as limiting. Within the content of the disclosure, gym is to be defined as any coordinated location wherein fitness and or health are emphasized and workouts may be performed.

Figure 1:
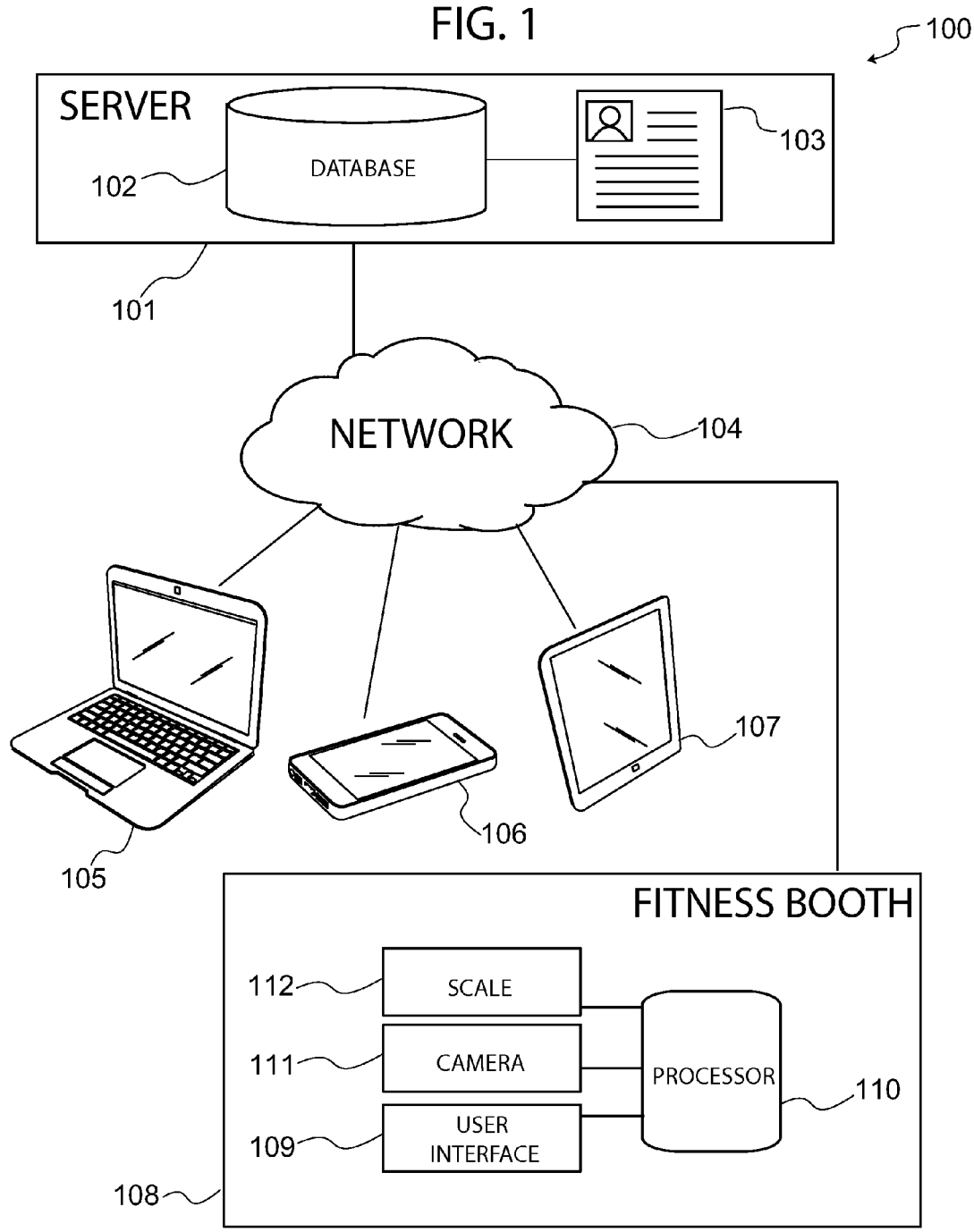
FIG. 1 is a block diagram of a system in accordance with an exemplary embodiment of the present invention.

FIG. 1 shows a block diagram of a system (system 100) in accordance with an exemplary embodiment of the present invention. System 100 comprises server 101, database 102, profile 103, network 104, remote devices 105, 106, 107, and fitness booth 108. Furthermore, in the embodiment shown, fitness booth 108 comprises several elements including user interface 109, processor 110, camera 111, and scale 112. System 100 enables users to capitalize on their motivation after each workout by facilitating tracking of their fitness progress. Each element of system 100 is discussed in turn.

Server 101 stores and provides data pertaining to a user's fitness progress in order to provide users with a means to track their personal progress with regards to their fitness goals. Without limiting the scope of the present invention, this fitness progress data may comprise weight data, body mass index data, body fat percentage data, exercise routine data, exercise type data, and personal user information such as age, sex and height. Server 101 may store information such as fitness progress data in individual user profiles such as profile 103. Thus, server 101 may act as a database server that performs information storage and retrieval services. Furthermore, server 101 may be a local server, a remote server, or a combination of multiple servers situated in one or more locations. As a local server, server 101 might be a gym's server within or in close proximity to the gym. As a remote server, server 101 may exist anywhere and may hold database information from one or more gyms. Typically, server 101 is configured to handle incoming requests from a variety of requesting entities. For example, and without limiting the scope of the present invention, a requesting entity may be a remote device, a fitness booth, website, or smart device application. Requests to server 101 may include a request to upload information pertaining to a user profile; a request to create a new user profile; and a request to access user information pertaining to a stored user profile.

As mentioned above, server 101 may be any type of server (i.e. one or more computers with a memory and a database) suitable for storing and providing fitness progress data. However, in an exemplary embodiment, server 101 comprises representational state transfer (REST) architecture. Although other architectures may be implemented, a REST server may be desirable to maximize efficiency, particularly in systems that may experience an expanding user profile pool. Furthermore, REST architecture adds an element of security that is well known and suitable for system 100, as server 101 may act a barrier between the various devices and applications requesting data and database 102. Furthermore, this architecture will provide a centralized means of connecting with other system components such as third-party advertisers, applications, and websites.

Server 101 may comprise different modules for performing different types of tasks. For example, and without limiting the scope of the present invention, server 101 may include a module for calculating a fitness analysis such as calculating BMI, body fat percentage, or providing graphics that show change in fitness data of a user over a period of time. Similarly, server 101 may include a module for providing advertisements and for providing a graphical user interface for users via a website or via a mobile application.

Database 102 typically contains substantially all the information acquired from users via fitness booth 108. For instance, database 102 may contain fitness booth profile information on three gyms in a five mile radius or on all gyms with a fitness booth.

Profile 103 contains a user's personal information and fitness progress data. Profile 103 may comprise the user's height, weight, body mass index, body fat percentage, a profile photo, length of usage, compilation of progress photos, or any other type of fitness-related or otherwise descriptive information. This data may be updated via fitness booth 108 or may be updated via a remote device such as remote device 106. Users may later view and share their profiles with other users in order to receive help with their fitness goals, help others achieve their fitness goals, or simply to share the information with other users.

Network 104 may be any type of network, such as a wide area network or a local network. Typically, network 104 is a wide area network such as the internet, wherein a large number of users may communicate from anywhere in the world. In exemplary embodiments, network 104 links many users via smart device and computer to provide mutual access to many internet-based features. Thus, network 104 may provide access to personal or mass profile information on a website or mobile device application. Network 104 provides the means to transmit information to or from a remote user or a local fitness booth user.

Remote devices 105, 106, and 107 may be any remote device connected to network 104. For example, and without limiting the scope of the present invention: remote device 105 may be a laptop for connecting a user to server 101; remote device 106 may be a smartphone for connecting a user to server 101; and remote device 107 may be a tablet for connecting a user to server 101. Users may connect to server 101 via remote devices 105, 106, 107 to log in to their respective fitness booth profiles, retrieving pertinent information from database 102 within server 101.

Fitness booth 108 may be used to gather and capture the required information in order to generate fitness progress data for users of system 100. Fitness booth 108 typically comprises user interface 109, processor 110, camera 111, and scale 112. Fitness booth 108 communicates with server 101 through network 104. A user, for example a gym member, may utilize fitness booth 108 before or after a workout in order to record their most recent fitness related data. For example, and without deviating from the scope of the present invention, a user may complete their exercise routine for the day and use fitness booth 108 to input their routine data, along with their current weight, body mass index, and or body fat percentage. Furthermore, users may upload one or more images of themselves in order to create a record of their progress. All this information is uploaded to server 101 under their user profile so that the user may access this information at a later time. In this manner, the user may gather fitness progress data every time he or she visits the gym, and upload the data for later retrieval.

User interface 109 is the means through which a user undergoes the steps necessary to complete an iteration in fitness booth 108. Any known user interface may be provided so long as it is suitable for gathering the required information from the user of fitness booth 108. For example, and without limiting the scope of the present invention, user interface 109 may be a simple computer such as a large tablet that includes a touch-screen. Of course, other interfaces may be suitable including a desktop computer with a screen and keyboard for providing user input. In an exemplary embodiment, user interface 109 comprises a touch-screen for receiving user inputs and providing visual and audio instructions to a user of fitness booth 108.

Processor 110 may be any suitable processor for carrying out the various functions of fitness booth 108. For example, and without limiting the scope of the present invention, processor 110 may be configured to receive user inputs pertaining to personal user information such as age, sex, and current height. Furthermore, processor 110 should be able to process images captured by camera 111 and receive and process weight information received from scale 112. Processor 110 may also be configured to receive information from other tools or components within fitness booth 108, such as fitness analysis tools that are capable of estimating a user's change in body fat percentage.

Camera 111 is utilized to capture images of fitness booth 108 users. Camera 111 may be any type of camera capable of capturing close range photographs. In one embodiment, camera 111 comprises a single camera that utilizes a wide angle lens. This may be desirable as different users have different body types and different heights. Other embodiments may include multiple cameras without deviating from the scope of the present invention, and any type of known camera system may be implemented so long as users are able to capture one or more images for uploading to server 101.

Scale 112 may display and record a user's current weight, which may also be uploaded to their profile. The user may then retrieve this data and compare it to the other fitness progress data that is compiled and stored by server 101. Weight data may be provided to the user via user interface 109, and provided to processor 110 in order to calculate other useful information, for example, the user's body mass index and or body fat percentage. Hence, while more complex scale systems may be incorporated to provide users with a wide range of data, scale 112 may be a simple scale configured to provide processor 110 with the weight of each user.

Images captured by camera 111 and information recorded by scale 112 are sent to server 101 via network 104 for storing in database 102. Each user typically has a unique identifier associated with a profile that contains personal fitness progress data. As a user continues to upload their information, each user's profile becomes a historical record of that user's fitness progression. Users may use this information as a source of motivation for themselves and others. By accessing their profiles via a remote device, users may not only access their own information remotely, but also share their fitness progress with others. Other services may be implemented as well. For example, help forums related to fitness may be enabled in which users share and discuss their fitness progress along with advice on how to achieve different types of fitness goals. Additionally, advertising opportunities may be enabled so that third-parties may share their products to users of system 100. For example, health products or fitness products may be advertised which are tailored to a user's needs ranging from organic foods to weight loss products, depending on the goals of each user of system 100.

Figure 2:
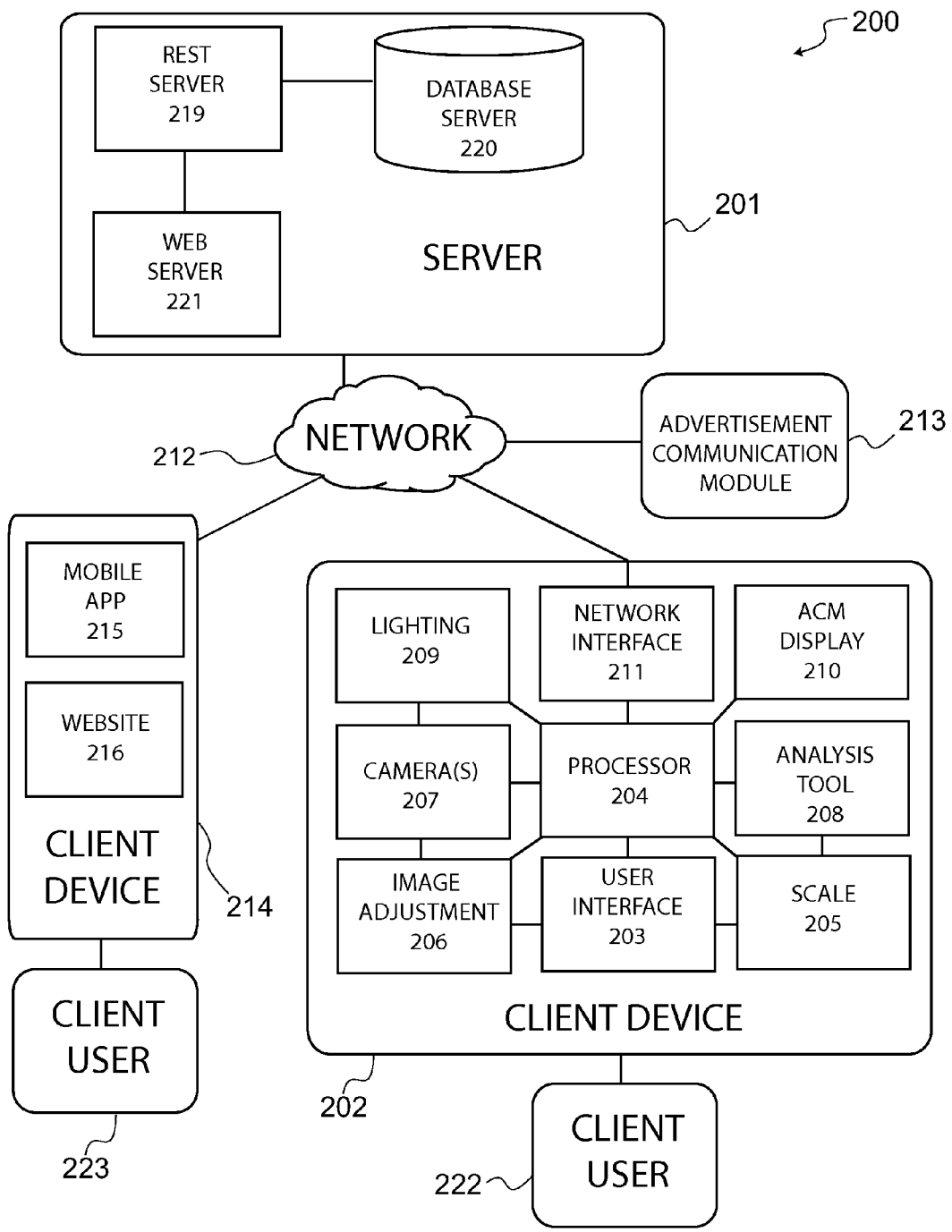
FIG. 2 is a block diagram of a system in accordance with another exemplary embodiment of the present invention, depicting components and sub-components of the entire system.

Turning to the next figure, FIG. 2 is a block diagram of system 200, another exemplary embodiment of the present invention, depicting components and sub-components of the entire system. System 200 is shown, comprising multiple servers for handling fitness progress data, and client devices from which a user may either provide or request fitness progress data. Furthermore, system 200 includes an advertisement communication module for implementing revenue opportunities through, for example, third-party affiliates that advertise to interested users of system 200.

System 200 comprises one or more centralized servers (server system 201) for storing fitness progress data that may be received from client devices such as client device 202, or client device 214. Client device 202 generally refers to one or more devices located in a venue or physical location where users can upload their fitness progress data, including images of their current physique. Client device 214 refers to one or more devices that have access to a graphical user interface, such as mobile device applications or websites, which are designed to provide users with access to their fitness progress data, including platforms wherein users can share their fitness progress data with others.

Client device 202 is adapted to facilitate the gathering of fitness progress data from a user, such as client user 222. This means that client device 202 typically includes the following components: user interface 203, processor 204, scale 205, image adjustment system 206, camera 207, fitness analysis tools 208, lighting 209, and an advertisement communication module display (display 210). While it may be desirable to provide these components in a compact structure such as a compartment or booth (see FIG. 1 and FIG. 4), for example similar to a photo booth, other configurations may be implemented without deviating from the scope of the present invention. For example, these components may be provided in a separate room sectioned off from the rest of a gym, or a closed area that is designated for using a system in accordance with the present invention, or simply a computer system for users to access their profile and update their most recent fitness progress data. In an exemplary embodiment, client device 202 is located in a gym, and provides these components in a fitness booth such as the one disclosed with reference to FIG. 4. This configuration is desirable as it offers a private environment in which users may take their pictures and upload their personal information.

Client user 222 may be a gym member utilizing a fitness booth to take one or more self images and record his current weight, along with other information pertaining to his recent exercise routine. Client user 222 interacts with the components offered via client device 202 to either create a profile or update an existing profile with current fitness progress data. Whether via a booth, a computer device in a separate room, or at a designated section of a gym, typically, client user 222 will be provided access to user interface 203.

User interface 203 may provide client user 222 with a graphical user interface (GUI) for guiding client user 222 through the fitness progress data gathering and uploading process. Typically, a touch screen may be provided, through which a GUI will display instructions that request input of various user information. Of course, other embodiments may be practice without deviating from the scope of the invention wherein regular screens rather than touch screens are utilized. User interface 203 may communicate with various components of client device 202, including processor 204, scale 205, camera(s) 206 and image adjustment system 207. In alternative embodiments, user interface 203 may communicate with more or less components without deviating from the scope of the present invention. User interface 203 brings the functionality of the several components of client device 202 to client user 222.

Processor 204 is typically a microprocessor that communicates with each component of client device 202. Processor 204 processes and responds to task requests from each component of client device 202, and is configured to communicate with server system 201 via network interface 211. Typically, processor 204 receives information from components of client device 202 and sends this information to server system 201 for storing under a profile associated with the user providing the information. For example, a user may step on scale 205; the weight value registered by scale 205 may be provided to processor 204, which in turn sends the information for storing at server system 201. In some embodiments, fitness progress data such as a user's weight, one or more photos, and a user's fat percentage may be first compiled by processor 204 before being sent to server system 201 for storage in the associated user profile. In alternative embodiments, processor 204 may simply send each data (i.e. the weight, each photo, and the percentage of a user's body fat) separately and directly to server system 201.

Scale 205 communicates with processor 204 to relay at least a user's weight to be displayed via user interface 203 and uploaded to server system 201 via network 212. Scale 205 may be any type of scale that can be adapted to communicate with user interface 203 and processor 204 for routing weight values from users to server system 201.

Image adjustment system 206 refers to the system which makes adjustments to maximize efficacy and clarity of user photos. Depending on the particular embodiment, image adjustment system 206 refers to a combination of tasks and/or components, which may adjust the camera's physical location, settings pertaining to the focus or scope of the lens, or both. Thus, in one embodiment, image adjustment system 206 may comprise of components to physically adjust camera 207 to the optimal position for capturing a user's picture. Alternatively, image adjustment system 206 may comprise of software for manipulating images in order to properly crop and edit images captured with camera 207.

Camera 207 may be one or more cameras. In an exemplary embodiment, camera 207 uses a wide-angle lens optimized for close-range image capturing to better ensure the ability to take or capture full body photos of a fitness booth user, such as client user 222. In any case, camera 207 may communicate with processor 204 in order to be able to capture user photos and forward those photos or images either user interface 203 or to server system 201 via network 212, or both.

Fitness analysis tools 208 are typically one or more tools for carrying out an analysis such as a percentage of body fat calculation. This analysis may be computational and accomplished by algorithms that take into account user input data, or may be determined by more complex versions of scale 205. Hence, in some embodiments scale 205 may comprise fitness analysis tools that provide a user with additional information such as body fat percentage, while in other embodiments fitness analysis tools 208 may encompass different components (from scale 205), which carry out similar calculations. These calculations may encompass body mass index calculations, body fat percentage calculations, changes of these values over a period of time, or any other calculation that may provide a user with an indication of their progress in relation to their fitness goals. For example, and without deviating from the scope of the present invention, a user interested in losing weight might be interested in obtaining a value of weight lost over a period of time, while a user interested in gaining weight may be interested in the weight they have gained over a specified period of time, in addition to any change in their percentage of body fat. In some embodiments, these calculations may be determined and obtained from components of client device 202, which are in turn routed to server system 101 for storing under a particular user's profile. In alternative embodiments, these calculations may be performed at server system 101, and client device 202 merely provides the data required for making the desired determinations.

Lighting 209 controls the lighting required to take proper images. Lighting 209 may adjust to ambient light or options entered by a user by providing more or less light. Lighting 209 may be automated or may be controlled via user interface 203. Lighting 209 may thus be complex lighting fixtures or merely stand alone lamps that provide adequate light.

Display 210 is a display for presenting information provided to client device 202 from advertisement communication module 213. Display 210 may display third-party advertisements to client user 222, or any other user in close proximity to display 210. Thus, while other uses may be implemented such as providing venue information, etc., via display 210, the display may be reserved for advertisements regarding products or services that client user 222 may have an interest in.

Network interface 211 may be any known interface for communication via network 212. Network 212 is typically a wide area network, although in some embodiments, network 211 may be a local area network. Typically, network interface 211 is a wireless modem for connecting to network 212, which comprises the internet.

Network 212 serves as the bridge between client device 202, client device 214, and server system 201. For instance, through network 212, a fitness booth user may have their post-workout photos taken at the gym and utilize client device 202 to upload the images, along with the user's weight and other pertinent fitness progress data, to server system 201, which may be made accessible immediately afterwards via client device 214.

Advertisement communication module 213 is typically a third-party server in communication with server system 201, client device 202 and client device 214 via network 212. Advertisement communication module 213 permits third-party sponsors or advertisement affiliates to communicate with parts of or the entire fitness booth experience so as to dynamically generate and serve advertisements locally or remotely to users. Advertisement communication module 213 may have advertisements displayed, for instance, on display 210, mobile app 215, or user web browser 216.

As explained above, client device 214 refers to any device with access to a graphical user interface, such as a mobile device application or website designed to provide users with access to their fitness progress data, including platforms wherein users can share their fitness progress data with others. Hence, client user 223 may access data previously uploaded to server system 201 from client device 202, by either using mobile app 215, or website 216. For example, in one embodiment, client device 214 permits a fitness booth user to access certain services associated with the fitness booth experience without actually being physically present at the fitness booth. Thus, a user not at the fitness booth, for example, client user 223, may be able to access fitness booth pictures, weight data, or any other type of fitness progress data through a remote device utilizing a mobile app or web browser, for instance, mobile app 215 or website 216. The remote device may be a smartphone, a laptop, or a personal computer with mobile app 215 or with access to website 216.

Mobile app 215 may, for example, be a phone or tablet application downloaded through Apple®'s App Store™. Accordingly, mobile app 215 may be downloaded through communication with a network, such as network 212, and used by client user 223 outside client device 202. Client user 223 may also access website 216 to access his fitness progress data by logging in via an internet-capable phone, laptop, tablet, or desktop computer.

Website 216 may comprise one or more web pages for displaying fitness progress data to a user. Website 216 may include a variety of features such as forums, chat rooms, and various functionalities to view, share, and obtain information that may help users with their fitness goals.

Server system 201, as mentioned above, may comprise one or more servers. In one embodiment (shown), server system 201 comprises REST server 219, database server 220, and web server 221. Server system 201 functions as a system through which large amounts of data can be stored and subsequently communicated through network 212, with network 212 exemplarily being the internet.

REST server 219 may serve as an intermediary between an information-requesting party, for instance, a smart phone application, and another server, for instance, database server 220. REST server 219 serves as an alternative to directly exposing database server 220 to network 212, thus better protecting system security.

Moreover, REST server 219 may act as a funnel through which a substantial degree of information from the local fitness booth, external networks, third party partners, and other servers, can be transmitted uniformly. Thus, small or large-scale system updates for the different means of influencing a user's fitness tracking experience may possibly be achieved through a single update to REST server 219, which may exemplarily impact smart phone apps, websites, and local fitness booth media alike.

Database server 220 holds substantially all data pertaining to the fitness booth, such as but not limited to, user pictures, profile information, usage data, or any other data. Web server 221 requests fitness booth data from database server 220 to provide web pages for a remote user such as client user 223 accessing server system 201 via client device 214.

Therefore, client user 222 may share recently uploaded images with client user 223 by uploading recently taken pictures to server system 201 (i.e. uploading images to database server 220) via network 212 from client device 202. Client user 223 may access this information from client device 214—that is, via accessing server system 201 by either using mobile application 215 or accessing website 214 from his or her mobile device. Alternatively, client user 222 may simply upload new fitness progress data to server system 201 and later view the information via client device 214. One goal of system 200 is therefore to provide each user of system 200 with a means of creating, viewing, and or sharing fitness progress data in order to aid each user in realizing their fitness goals.

Figure 3A:
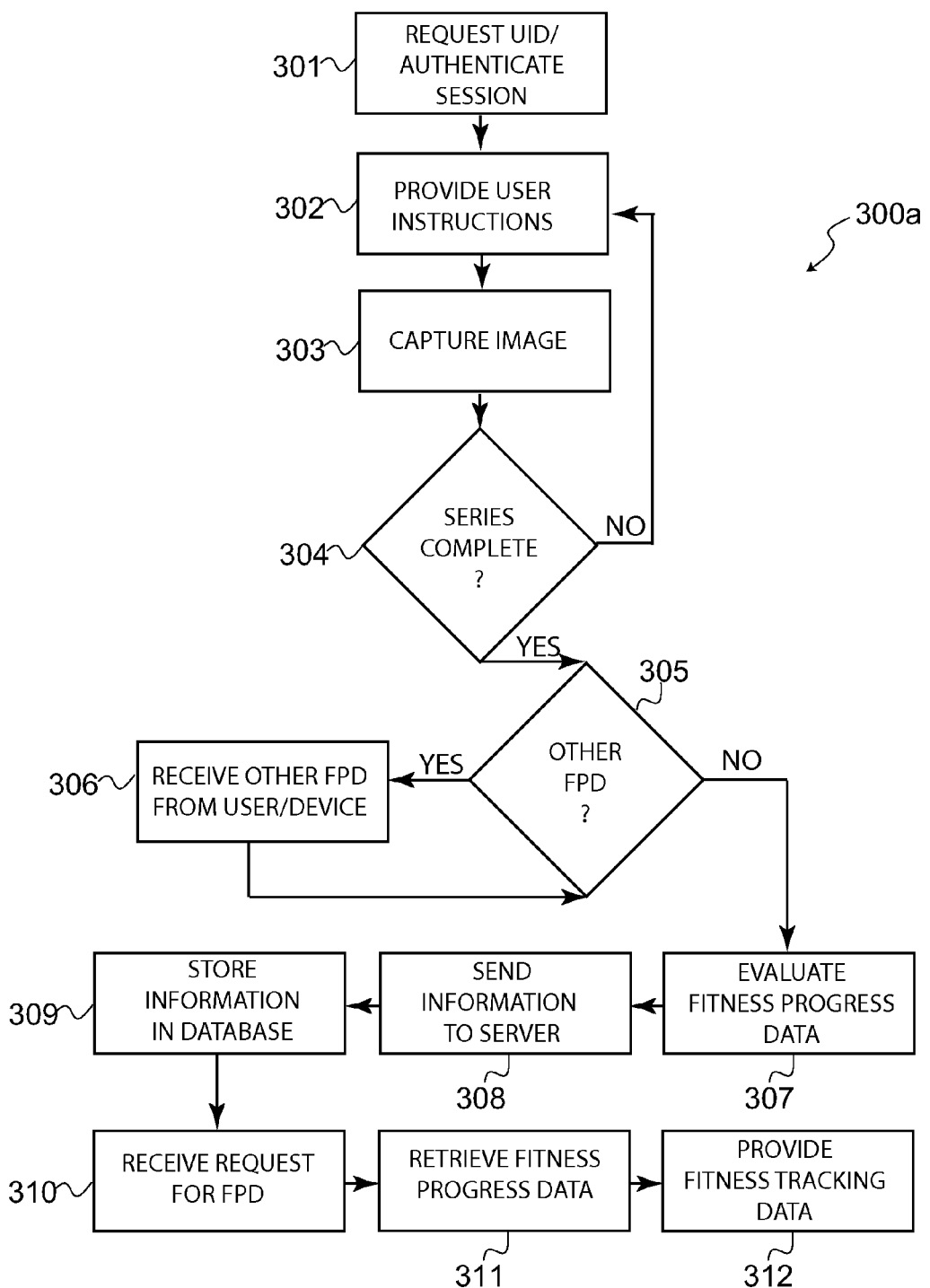
FIG. 3(a) is a flowchart illustrating one method of tracking fitness progress, in accordance with an exemplary embodiment of the present invention.

Now turning to the next figure, FIG. 3(a) is a flowchart illustrating one method of tracking fitness progress, in accordance with an exemplary embodiment of the present invention. Method 300a comprises several steps; these steps are described in the following order, however any other conceivable sequence of these steps may be practiced without deviating from the scope of the present invention.

Step 301 comprises requesting and authenticating a user's session. This step may include obtaining user identification or login information. A user wishing to utilize client device 202, or a fitness booth in accordance with the present invention, may be immediately prompted to verify their account through the entering of a username and password. The username and password may be created the first time a user uses client device 202 or by requiring a user to sign up via a website. In an exemplary embodiment, initial account setup information comprises a user's username, password, and any other pertinent identifying information that may be required to create a user profile, such as providing an email address, etc. Other embodiments may be practiced wherein more or less information is initially requested. Once a user has created and logged into an account, client device 202 is ready for data collection, starting with the data described in step 302.

In one embodiment, step 301 authentication further comprises actualizing a session in which server system 201 is in communication with client device 202 until the session is over. In another embodiment, step 301 authentication further comprises actualizing a session in which client device is not in communication with server system 201, but is nevertheless ready for providing instructions and or receiving user input, in order to later communicate the compiled data to server system 201. Hence, a communication with server system 201 may be established at step 301 or at a later point in the process without deviating from the scope of the present invention.

In step 302, instructions are provided for a user of a client device, for example, client device 202. These instructions may comprise of requesting the user to input information, to state information, or to comply with commands that guide the user to use the user interface of client device 202. In one embodiment, instructions comprise of requesting or guiding the user to step on a scale of client device 202 in order to read the user's weight. In another embodiment, the user is requested to input his or her weight information via the user interface. In another embodiment, the user is requested to step on a scale platform and face a camera of client device 202 in order for the client device to capture an image of the user. In yet another embodiment, the instructions include all of the above mentioned instructions in order to collect a variety of fitness progress data from the user.

Step 302 comprises providing a user with instructional information for obtaining fitness progress data such as taking progress images. This may include, but is not limited to, aiding the user with timing, pose, lighting, and number of photos. The user interface may provide a visual representation of the upcoming pose the user needs to emulate, as well as a countdown timer. In an exemplary embodiment, the user may stand on the scale for each of the possible photos in order for the system to capture the user's weight at the same time as the user's photos are being taken. In other embodiments, the instructions for obtaining a user's weight may come after the user images have been captured.

Step 303 typically comprises capturing one or more images after a countdown timer has terminated. The image may be captured using one or more cameras. Thereafter, at step 304, a determination may be made, for example based on the user's settings and status, whether the series of images has been completed. If not, step 302 is reinitiated and the user is given yet another set of instructions. For example, the user may be provided another set of visual representations to emulate and presented with a countdown timer.

In an exemplary embodiment, the series of photos is set at a fixed number, comprising a default sample of poses. This may be desired for ensuring fast turnaround from one user to the next and simplifying the process of taking fitness photos as much as possible. The default sample may, for instance, be three photos, and allow a user to complete an iteration of the fitness booth experience in less than a minute.

In another exemplary embodiment, the series of photos is customizable, wherein the user has control over how many photos are taken and in which poses. This may be desired to better personalize the fitness tracking experience and potentially provide a more robust, complete set of photos for enhanced documentation.

In yet another exemplary embodiment, the user may review the photos and choose to reshoot one or more of them before finalizing the series and submitting it. Additionally, the user may then review or edit their profile.

If the series of images is complete, another determination may be made in step 305. In step 305, a determination may be made of whether any other fitness progress data may be provided by the user. For example, other fitness progress data may include a weight of the user, a height of the user, an exercise routine the user has completed, or any other fitness related data that can be tracked for purposes of evaluating progress the user is making towards their fitness goals. If no other fitness progress data will be provided by the user, then in step 307 an optional evaluation of the data obtained thus far may be performed in step 307. If other fitness progress data is available for the user to provide, then in step 306, fitness progress data may be received either via a user input or by receiving the information from a component of the client device—for example, a weight may be provided by a scale of the client device, a height may be provided by a user input, or any other pertinent data may be provided by any means.

Other pertinent data may be requested via instructions or may be provided by the user. For example, and without deviating from the scope of the present invention, the user's height may be recorded during the account creation phase (i.e. this may be desirable if the user is an adult and there is no likely change in height of the user). In embodiments wherein height is not recorded during the account creation phase, step 306 may comprise instructions for obtaining both height and weight values. In one embodiment, height may be taken regularly over the course of time a user utilizes client device 202 (i.e. this may be desirable if the user is a young individual and a change in the user's height is expected).

In an exemplary embodiment, height may be manually inputted by the user. However, in other embodiments, a height value may be determined using the cameras present on the fitness booth's control panel. Due to the consistent distance from which the cameras will take photos of fitness booth users, height may be estimated with a reasonable degree of accuracy. Again, this may be advantageous for young users who are still growing and do not wish to manually measure their height frequently in order to get proper fitness analyses.

Weight may be recorded using an integrated scale configured to communicate with the user interface of the client device. Other information such as exercise routines that the user has completed may be provided via the user interface by the user.

Once there is no additional fitness progress data from the user, in step 307 an evaluation may be made for determining different information. This evaluation may be determined at a server, such as server system 201, or may be made by a client device, such as client device 202, or may be processed by a mobile device such as client device 214. For example, and without deviating from the scope of the present invention, the user's weight value and the user's height allows for a calculation of body mass index (BMI) in step 307, if an evaluation of the data is desired. In an exemplary embodiment, the scale is equipped to provide an estimate of the user's body fat percentage. This may be done using a technique known as bioelectrical impedance analysis (BIA), the specifics of which would be known or easily ascertainable for a person of ordinary skill in the art. Other techniques may be used in lieu of BIA without deviating from the scope of the present invention; alternatively, in other embodiments, no such evaluation is performed, and step 307 is skipped in order to send the information to a server in step 308.

Step 308 may comprise of sending the compiled information to a server. Fitness progress data, such as photos weight, fat percentage, BMI, and other compiled information, may be sent from the client such as client device 202, to a server, for example server 201.

In step 309, the information reaching the server may be stored in the server's database, wherein the database comprises that user's profile. The user's profile may be updated with the new fitness progress data, including but not limited to, for example, the most recent height, weight, BMI, and set of progress images from the user. This information may be integrated into various other graphical, visual, and textual representations of fitness and progress to provide a more robust fitness tracking experience.

In step 310, a request may be received from a client device, requesting fitness progress data from a user. This step may comprise utilizing a graphical user interface to access personal and community profile information through internet-capable devices such as, but not limited to, desktop computers, laptops, tablets, or mobile phones. Such graphical user interfaces may take form of a website, application, program, or other similar form. In an exemplary embodiment, the graphical user interface is a website, allowing a user to login through an internet-capable device. In another exemplary embodiment, the graphical user interface is an application, such as one that might be purchased or downloaded from the Apple® App Store™.

In step 311, after authenticating the user request for fitness progress data, the database may be accessed and the data retrieved for the user. Once retrieved, in step 312, fitness progress data may be provided to the user, for example, via client device 214.

Now turning to the next figure, FIG. 3(b) is a flowchart illustrating one method of tracking fitness progress from a server, in accordance with an exemplary embodiment of the present invention. Method 300b comprises several steps; these steps are described in the following order, however any other conceivable sequence of these steps may be practiced without deviating from the scope of the present invention.

In step 313, the server may receive a request to initiate a new session. After receiving user identification and performing a security protocol to verify the user, in step 314 the session is authenticated. In step 315, the server may receive fitness progress data from a client device such as client device 202. This information may include, for example, a user's weight, a user's images, other information such as a user's exercise routines, and any other information that may be helpful for tracking a user's fitness progress. Once this information is communicated to the server, in step 316, the server stores this information, updating a user's profile with the new fitness progress data.

In step 317, a request may be received to retrieve fitness progress data from one or more users. This step may require another authentication and verification process in order to provide a user with the requested fitness progress data. In step 318, the server may retrieve fitness progress data from its database, wherein the fitness progress data is associated with the user. Alternatively, depending on permissions granted to the user, another user's fitness progress data may be made available to the requesting user. So long as permission is granted, and user identification is verified, in step 319, the server may provide the user fitness progress data to the requesting entity, for example client device 214.

Figure 3C:
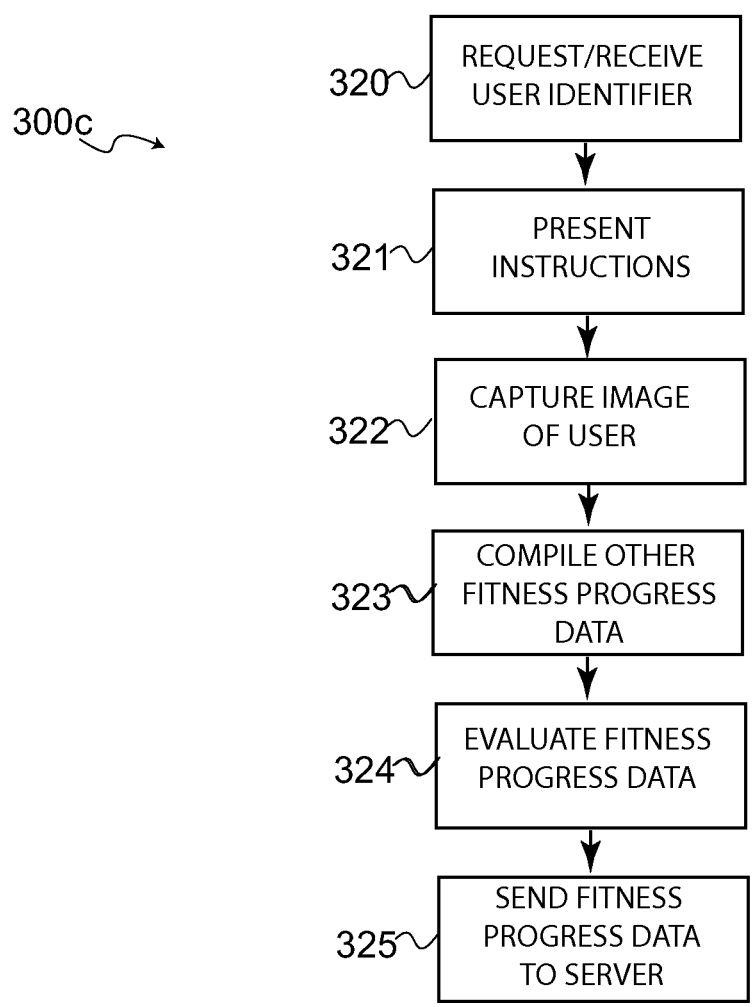
FIG. 3(c) is a flowchart illustrating one method of tracking fitness progress from a client device, in accordance with an exemplary embodiment of the present invention.

Now turning to the next figure, FIG. 3(c) is a flowchart illustrating one method of tracking fitness progress from a client device, in accordance with an exemplary embodiment of the present invention. Method 300c comprises several steps; these steps are described in the following order, however any other conceivable sequence of these steps may be practiced without deviating from the scope of the present invention.

In step 320, a request for user identification information is made and received. This may include initially setting up a user profile or merely verifying and authenticating an existing user. In step 321, instructions are presented in order to guide the user in providing any fitness progress data such as weight, height, and any other pertinent information. Additionally, in step 321, the user may be guided in order to capture one or more images of the user's physique. In step 322, one or more images of the user may be captured. As mentioned above, the user may be offered an opportunity to either update images, or take additional images, or choose from a selection of captured images before sending the images to the server. In step 323, additional information may be added by the user, for example, the user may input exercise routines they have recently completed.

In step 324, the client device may perform an evaluation of fitness progress data in order to, for example, calculate a BMI, or any other information that may be helpful to the user. In alternative embodiments, this evaluation or determination may be made by the server rather than by the client device, or by a mobile device that is used to view the information; hence, the processing power to perform the analysis may rest at the server, or at client devices.

Once all the desired information is received from the user, and any evaluations or determinations by the client device are performed, then in step 325 the fitness progress data is sent to a server.

Figure 3D:
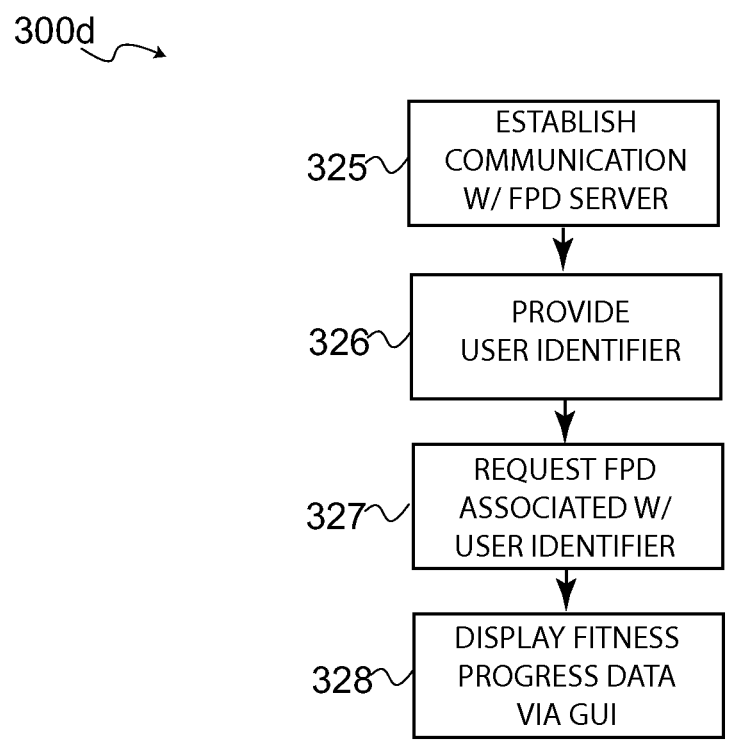
FIG. 3(d) is a flowchart illustrating one method of tracking fitness progress from a client mobile device, in accordance with an exemplary embodiment of the present invention.

Now turning to the next figure, FIG. 3(d) is a flowchart illustrating one method of tracking fitness progress from a client device such as a mobile device or computer, in accordance with an exemplary embodiment of the present invention. Method 300d comprises several steps; these steps are described in the following order, however any other conceivable sequence of these steps may be practiced without deviating from the scope of the present invention.

In step 325, the client device, for example a mobile device, a laptop computer, or desktop computer, may establish a communication with a server such as server system 201. This may be achieved by means of a mobile application on a mobile device, or by accessing a website from the client device. Upon establishing communication, in step 326, the user may provide user identification in order to receive authentication and permission to access the server.

In step 327, once access to the server is granted, the client device may send a request for fitness progress data associated with the user. Alternatively, a request may be made for fitness progress data of other users, depending on the permissions of the requesting user. In step 328, the server has granted access, and the client device receives the requested data. The fitness progress data may then be displayed on the client device.

After gaining access to a graphical user interface adapted to receive fitness progress data, the user may be presented with a number of options aimed at maintaining and transplanting the post-workout motivation surge to a location other than the gym, such as a user's home. The user may be able to visually, graphically, and textually monitor fitness progress and share that progress with other fitness booth users and members of their social media circles.

With respect to sharing progress with other users, a user has a myriad of options for choosing to what extent their profile is shared. For instance, in accordance with an exemplary embodiment of the present invention, users have the ability to set their profile to public, faceless public, and private. A public profile is entirely viewable by other users. The user's profile photo, progress photos, height, weight, BMI, length of membership and other information pertaining to their fitness progress and goals are displayed. A faceless public profile is identical to a public profile, except photos are not shared with the community. Lastly, a private profile is not shared with the community in any appreciable manner.

With respect to sharing progress with members of a social circle, a user has the option through the graphical user interface to publish aspects of or their entire profile with Twitter® followers, Facebook® friends, Instagram® followers, and the like. The user may choose to selectively or automatically share all progress, or direct manual and automatic sharing differently depending on the social media outlet or the content of the post. Without limiting or deviating from the spirit or scope of the present invention, the user may, for example, choose to automatically post graphical information of weight, body fat percentage, and BMI to Twitter®, automatically post graphical and photographical information to Facebook®, and post photos to Instagram® on a case by case basis.

Figure 4:
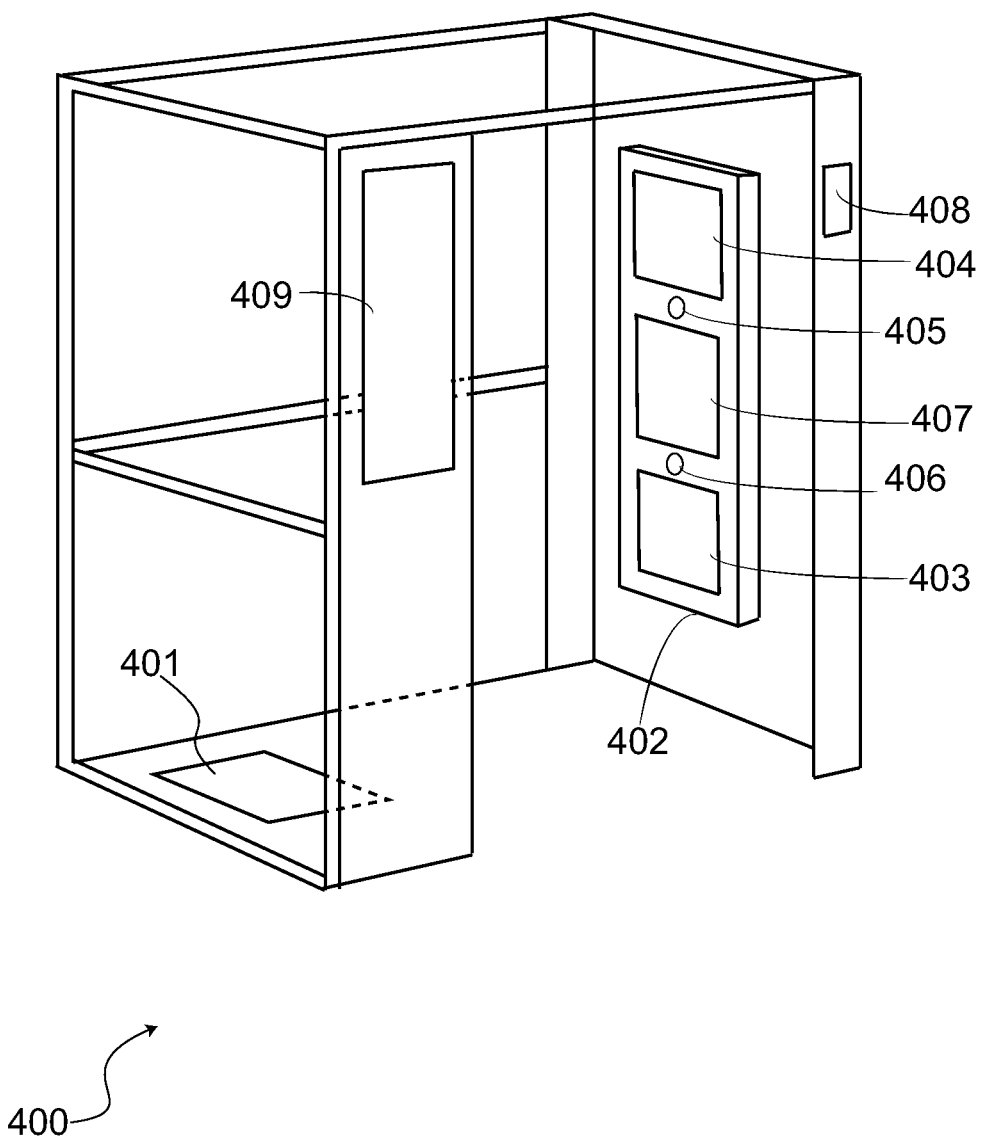
FIG. 4 illustrates a client device comprising an enclosure, in accordance with an exemplary embodiment of the present invention.

FIG. 4 illustrates a client device comprising an enclosure, hereinafter referred to as a fitness booth, in accordance with an exemplary embodiment of the present invention. Fitness booth 400 comprises scale 401, control panel 402, light panel 403, light panel 404, camera 405, camera 406, user interface 407, and vacancy indicator 408.

Fitness booth 400 may have similar dimensionality to a photo booth or widened phone booth. Fitness booth 400 may be located anywhere within or proximate to a gym, for instance near the gym's exit and entrance, in a corner, or in a locker room. Alternatively, fitness booth 400 may be larger or smaller than a typical photo booth, without limiting or deviating from the scope of the present invention.

Fitness booth 400 may be constructed and outfitted with any number of materials. By way of a non-limiting example, fitness booth 400 may comprise aluminum framing or any other type of metal. Without limiting or deviating from the spirit or scope of the present invention, structural panels may comprise, for example, plexiglass, frosted acrylic, acrylic, or nylon. Furthermore, the entrance to fitness booth 400 may be a door, curtain, or other means with which to provide privacy. If the entrance is a door, the door may be, in one embodiment, comprised of nylon, though other materials may be used in addition to or in lieu of nylon. Fitness booth 400 may be covered by an enclosure, allowing a user to have complete privacy while updating fitness progress. In an exemplary embodiment, this enclosure may comprise plastic, cloth, or the like.

Scale 401 is used to weigh the user and exemplarily calculate the user's BMI and body fat percentage. In an exemplary embodiment, stepping on scale 401 will immediately prompt an interactive display and timer countdown for taking progress photos, assuming the user is logged in. Scale 401 may be designed and integrated into fitness booth 400 in a number of ways. In one embodiment, scale 401 is an elevated scale with ramps surrounding it from the front, left, and right sides. In this embodiment, the rear of scale 401 will comprise a platform flush with scale 401 used to hide unsightly electrical wiring. In a separate embodiment, the entire floor of fitness booth 400 is elevated above the ground outside it, wherein a cutout is made to allow scale 401 to be installed flush with the rest of the floor.

Control panel 402 comprises light panel 403, light panel 404, camera 405, camera 406, and user interface 407. Control panel 402 contains a majority of the important features utilized in tracking fitness progress. These features are elaborated upon in FIG. 5.

Light panels 403, 404 provide the lighting for profile and progress photos and are important for maintaining consistency in photos amidst potentially unpredictable light within the gym. In embodiments wherein the entrance to fitness booth 400 does not allow appreciable light to enter, light panels 403, 404 illuminate the otherwise dim interior of fitness booth 400.

Cameras 405, 406 take the profile and progress photos for a fitness booth user, in accordance with an exemplary embodiment of the present invention. In a separate embodiment, the number of cameras differs from two. For instance, fitness booth 400 may comprise a single camera with the ability to capture an entire body with a high level of detail. However, with respect to FIG. 4, cameras 405, 406 aid in taking detailed photos of particular sections of the body. For instance, camera 405 may take photos of the top half of a user's body, whereas camera 406 may take photos of the bottom half of a user's body. In such instances wherein a full body-length photo is taken, cameras 405, 406 may take overlapping photos in which the overlapping regions are visually resolved into a single segment and the photos are combined into a single flowing visual thereafter. This feature is similar to how a panoramic photo is achieved using multiple overlapping photos. Alternatively, either camera 405 or camera 406 may be tasked in lieu of the other to take a full-length or near full-length photo. Other embodiments may exist which permit greater or fewer cameras to be implemented as a component of control panel 402 or as a separate entity from control panel 402.

User interface 407 provides the means for a user to initiate, personalize, visualize, and complete their fitness booth experience. User interface 407 is the interactive means within fitness booth 400 which displays the login screen, timers, poses, photo series, and the like. In an exemplary embodiment, user interface 407 is a touch screen device.

With respect to FIG. 4, user interface 407 resides below camera 405 and above camera 406.

Vacancy indicator 408 provides a visual indication of whether or not fitness booth 400 is presently in use. Vacancy indicator 408 resides on the outside of fitness booth 400 so as to inform patrons not currently using fitness booth 400. In an exemplary embodiment, vacancy indicator 408 will have two buttons, with one button indicating occupancy and the other button indicating vacancy. This indication may be publicized via a light emitting from the button corresponding to the present vacancy status. Vacancy indicator 408 may receive vacancy statuses through a number of different means that would be known by a person of ordinary skill in the art.

Lastly, in an exemplary embodiment, fitness booth 400 may comprise display 409, which may be situated on the exterior of fitness booth 400. Display 409 may be used for promotional purposes. For instance, and without limiting or deviating from the spirit or scope of the present invention, the screen may be used to promote the gym hosting the fitness booth or promote fitness-related products sold or sponsored by the gym or any third party, among any number of other purposes.

Figure 5A:
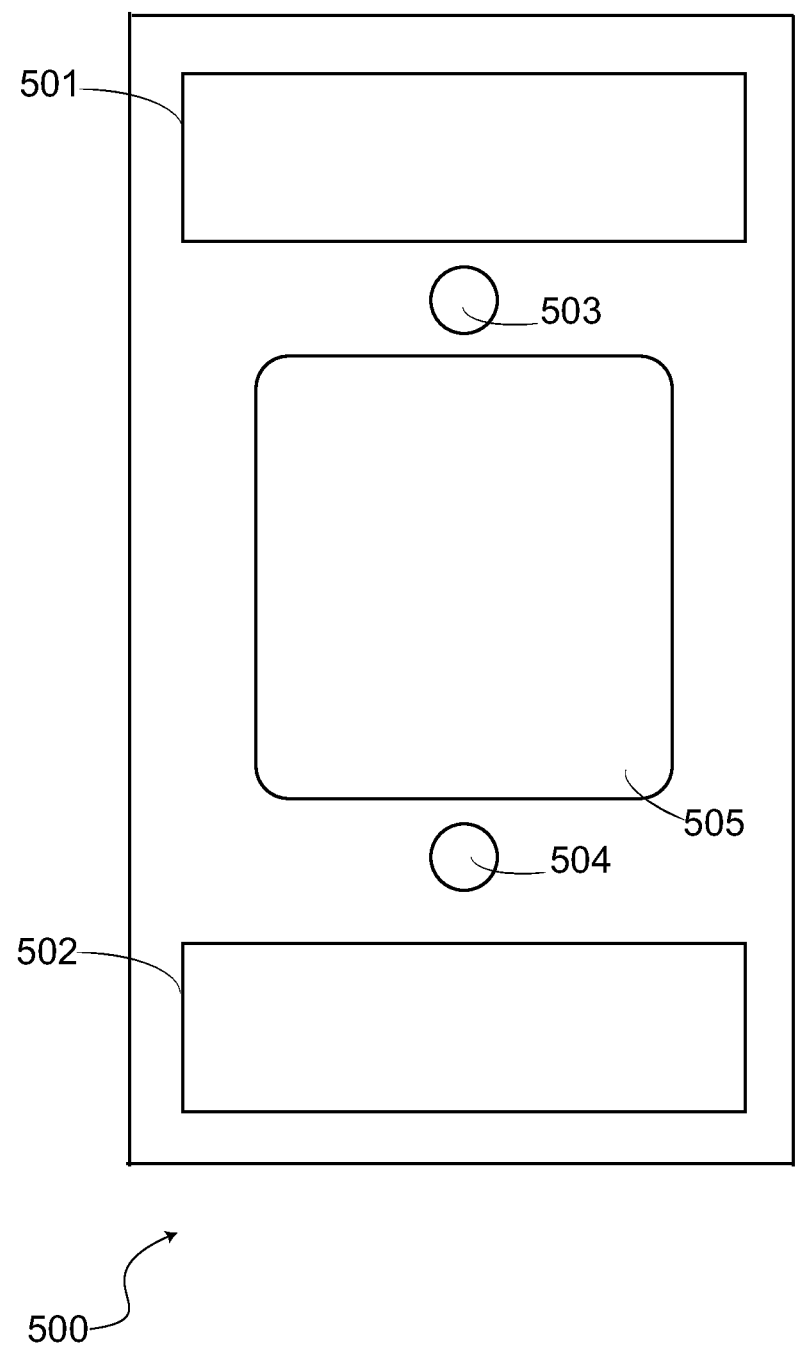
FIG. 5(a) illustrates one embodiment for a control panel in accordance with the present invention.
Figure 5B:
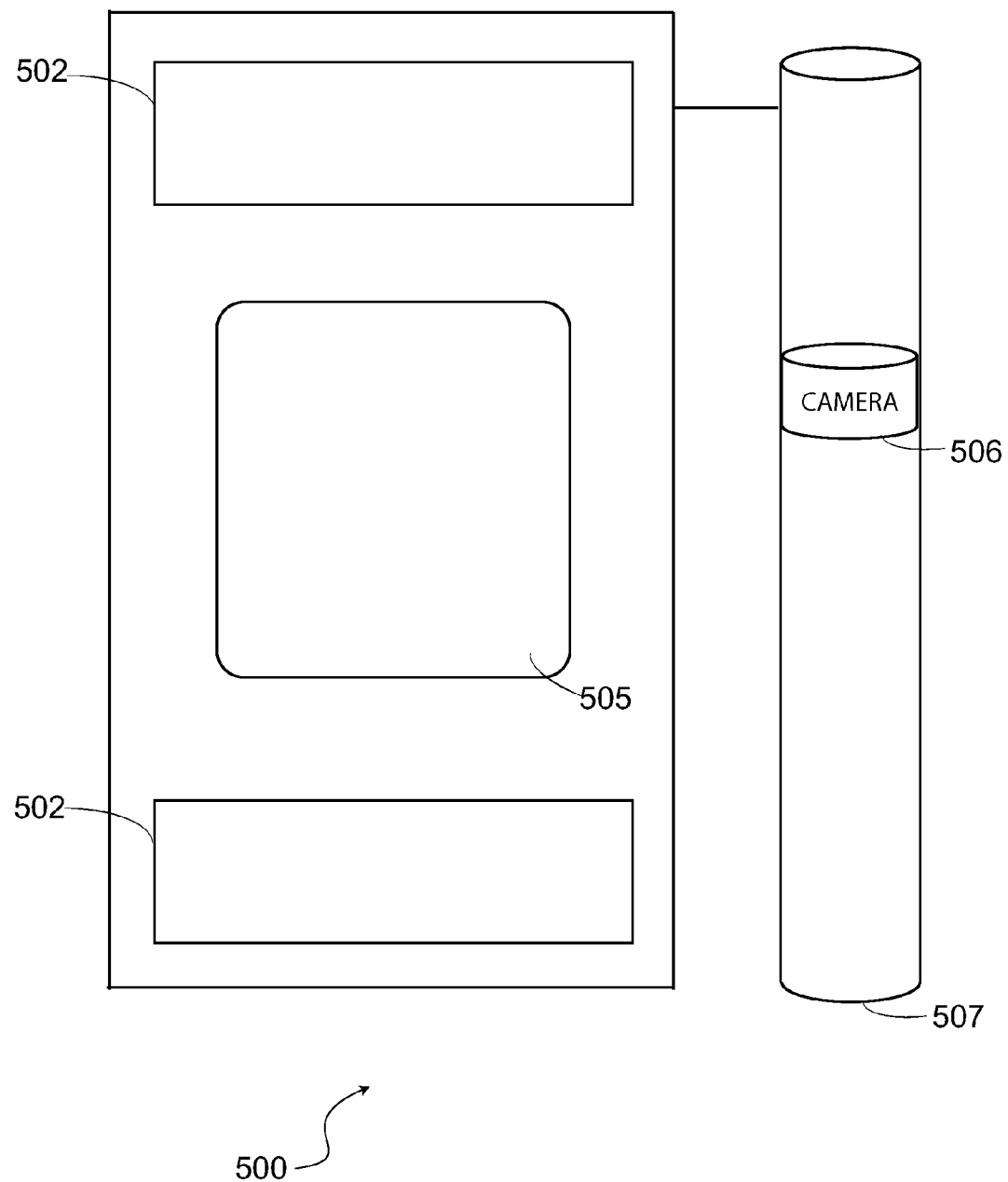
FIG. 5(b) illustrates another embodiment for the control panel discussed with reference to FIG. 5(a) in which an image adjustment system with a motorized mount configured to vertically adjust the height of a camera is implemented.

FIG. 5 (a) and FIG. 5(b) illustrate alternative embodiments of control panel 500. In one embodiment, shown in FIG. 5(a), control panel 500 comprises light panel 501, light panel 502, camera 503, camera 504, and user interface 505.

Light panels 501, 502 provide flash lighting for a user's photos. In an exemplary embodiment, light panel 501 and light panel 502 each comprise at least one standard light and at least one flash. Light panel 501 may be used to provide light to the lower half of a user's body, whereas light panel 502 may provide light to the upper half of a user's body. However, undiffused light may be too strong for such photos. Therefore, in another exemplary embodiment, the light emanating from panels 501, 502 may be diffused using a milky plastic coating or other diffusive means present on panels 501, 502 so as to soften the light passing through them.

Cameras 503, 504, as pictured in FIG. 5(a) may be mounted and fixed on control panel 500 facing forward towards the user. In an exemplary embodiment, camera 503 and camera 504 may both comprise single-lens reflex cameras, though other embodiments exist wherein this is not the case and different camera types or lenses are implemented. In an exemplary embodiment, each camera within the present fitness booth is a wide-angle lens camera.

User interface 505 may be a touch-screen tablet used as the means for receiving and requesting information from the fitness booth user. In one embodiment, user interface 505 has its bottom tilted approximately 15 degrees away from being parallel with the mounting face of control panel 500 so as to ease user interaction with the screen.

FIG. 5(b) illustrates another embodiment for control panel 500 in which a image adjustment system with a motorized mount configured to vertically adjust the height of a camera is implemented. The image adjustment system may be implemented into control panel 500 or may comprise a different structure. Typically, the image adjustment system aids in minimizing the size of the photo-taking apparatus, while still maintaining consistency in user photos, regardless of a user's height. The image adjustment system may comprise of camera 506, and camera support 507, which includes a motorized camera mount.

Camera support 507 may be any type of support permitting the motorized camera mount and camera 506 to move vertically. This movement may be triggered upon a user logging in or entering a height value. In one embodiment, receipt or retrieval of the user's height may cause camera 506, through motorized camera mount of camera support 507, to move to a particular vertical height based on that user's height. For instance, a taller than average user may see camera 506 adjusted higher than its default position. Conversely, a shorter than average user may see camera 506 adjusted lower than its default position.

Without limiting or deviating from the spirit or scope of the present invention, the image adjustment system may either be incorporated into the fitness booth control panel depicted in FIGS. 4-5, wherein the camera support is a piece present in or on the control panel, or may be incorporated as an entity adjoined to or separate from the control panel. In any case, the image adjustment system may comprise one or more cameras with one or more motorized camera mounts, which adjust based on the user's height value.

Additionally, the image adjustment system may, through the fitness booth's processor, make adjustment to camera 506's lens so as to capture the desired region of the user's body. In an exemplary embodiment, this lens is a wide-angle lens, which aids in capturing an entire user's body even from a close range.

Figure 6:
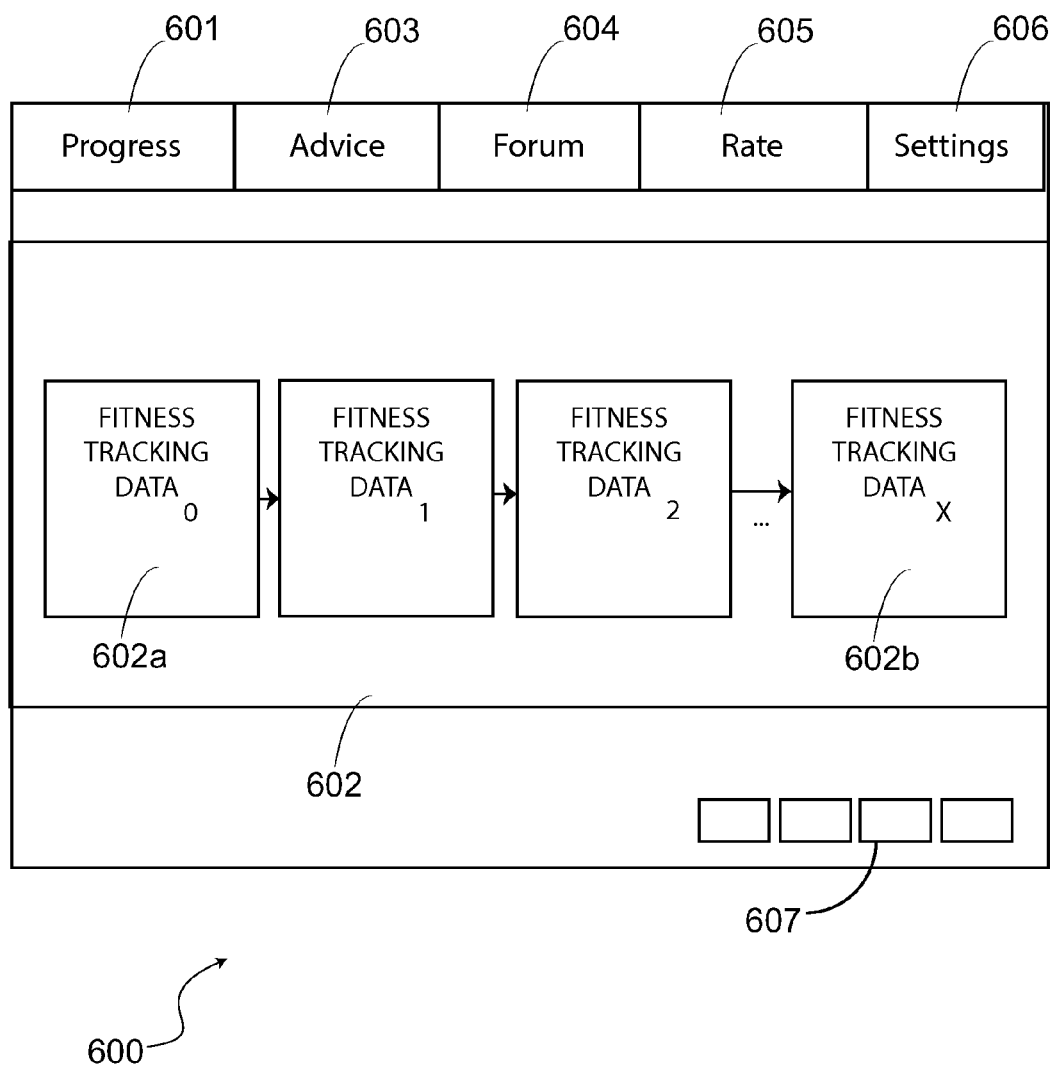
FIG. 6 is a visual representation of a graphical user interface for providing users with remote access to fitness progress data, in accordance with an exemplary embodiment of the present invention.

FIG. 6 is a visual representation of a GUI, in accordance with an exemplary embodiment of the present invention. GUI 600 comprises progress tab 601, visual progress indicator 602, advice tab 603, forum tab 604, rate tab 605, account settings tab 606, and share icons 607.

GUI 600 represents an exemplary embodiment of a graphical user interface, such as one a user might encounter on a website or mobile device application pertaining to the present invention. However, other such graphical user interfaces with different data presentation, tabs, and features may exist without departing from the spirit or scope of the present invention. Once the user logs in to the GUI source, the presently illustrated configuration of data objects may result. For the purposes of simplicity, let reference to GUI tabs also refer to the information represented in the tab's corresponding page. Thus, in some embodiments, each tab may direct users to a dedicated page for content pertaining to a particular topic.

Progress tab 601 allows a user to view in depth fitness progress data related to their fitness progress and do so through a number of different formats. Several of these formats may utilize visual progress indicator 602. Formats may include, but are not limited to, images, graphical documentation, textual records, and numerical data. Fitness progress data may include, but is not limited to, photos, weight, BMI, body fat percentage, height, exercise routines, exercise types, calories burnt, calorie intake, dietary plans, or any other data that a user may benefit from recording in the system. This data may be recorded at a fitness booth or later added via a website or application. At any time, fitness progress data may be provided to the user for review.

For example, all photos taken by any fitness booth can be extracted through a corresponding server's database, perhaps the gym's database or a more centralized server and database. The user may sift through each of the photos by date taken, weight, BMI, or any other similar categorical means. This may be done with all data compiled by a fitness booth or a graphical user interface.

Visual progress indicator 602 may provide a visual metric of the fitness booth user's progress over time or provide the user's fitness progress data. For example, visual progress indicator may display figures, images, graphical data pertaining to the user's physique, weight changes over time, or any other parameter of interest. For example, and without limiting the scope of the present invention, a user that has made use of the fitness booth for several months, and who has lost a total of 40 pounds via exercise may access GUI 600 and see visual progress indicator 602. In that case, visual progress indicator 602 may provide a one or more parameters that the user may be interested in tracking. For instance, if at a starting period the user weighed 160 pounds, but in a subsequent period the user weighed 120 pounds, the user may be interested in tracking his weight, and thus a graph depicting the change in weight may be displayed for his review. Similarly, photos may be displayed that represent the records that user has recorded through that period. Thus, an initial fitness tracking data object 602a may comprise of a starting weight or starting photograph of the user, and a current fitness tracking data object 602b may comprise a current weight or current image of the user showing his new physique.

Advice tab 603 is a means for users to get tips and advice on a myriad of fitness-related topics, for instance workout tips, dietary suggestions, and ideas for maximizing the fitness booth experience. This may come from fitness booth administrators, workout gurus, or any other fitness professionals.

Forum tab 604 is a more personal, interconnected application of the advice found in advice tab 603, wherein fitness booth users can communicate and trade tips, advice, encouragement, and fitness progress with one another. Forum tab 604 serves as a means to further motivation beyond the actual fitness booth and corresponding gym and keep users upbeat and positive about the oft-daunting task of maintaining a workout regimen and reaching fitness goals. Forum tab 604 users may choose to follow one another's progress through following or friending the user within the forum.

Rate tab 605 affords yet another source of motivation for fitness booth users, wherein a user may rate how another user is progressing in their fitness goals. A user receiving an unsatisfactory rating from another user may become motivated to change that rating through longer, more intense, or more frequent fitness sessions at the gym, or by altering other lifestyle choices pertaining to fitness and health.

Settings tab 606 allows a user to alter account settings such as a username, password, email address, privacy settings, progress sharing, or the like. Changing a username or password will, in an exemplary embodiment, automatically change the corresponding username or password for logging in at a fitness booth through communication with a centralized server.

Share icons 607 provide a means whereby a user can manually select which social media outlets they wish to publish their progress to. With respect to FIG. 6, share icons 607, like visual progress indicator 601, are components of progress tab 602. Thus, share icons 607 particularly refer to sharing visual progress indicator 601 with social media circles. However, if the user were viewing a separate page within progress tab 602, the option to share progress through share icons 607 may refer to the data presented on the corresponding page. The method with which this information is shared with the social media circle is dependent on the specific social media site, though such methods would be known or easily ascertainable by a person of ordinary skill in the art.

A system and method for tracking fitness progress has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

DESCRIPTION OF REFERENCE SYMBOLS

100: System
101: Server
102: Database
103: Profile
104: Network
105: Remote device
106: Remote device
107: Remote device
108: Fitness booth
109: User interface
110: Processor
111: Camera
112: Scale
200: System
201: Server system
202: Client device
203: User interface
204: Processor
205: Scale
206: Image adjustment system
207: Camera
208: Fitness analysis tools
209: Lighting
210: Advertisement communication module display (Display)
211: Network interface
212: Network
213: Advertisement communication module
214: Client device
215: Mobile App
216: Website
219: REST server
220: Database server
221: Web server
222: Client user
223: Client user
400: Fitness booth
401: Scale
402: Control panel
403: Light panel
404: Light panel
405: Camera
406: Camera
407: User interface
408: Vacancy Indicator
500: Control panel
501: Light panel
502: Light panel
503: Camera
504: Camera
505: User interface
506: Camera
507: Camera support
600: Graphical user interface
601: Progress tab
602: Visual progress indicator
603: Advice tab
604: Forum tab
605: Rate tab
606: Settings tab
607: Share icons

What is claimed is:

1. A server computer for tracking fitness progress of a user by compiling fitness progress photographs via a client device and distributing the fitness progress photographs by way of a graphical user interface (GUI), the computer comprising:
a network interface for communicating with a client device housed within a booth and situated inside a gymnasium, the client device configured to:
display a visual representation of a first athletic pose;
instruct the user to emulate the first athletic pose in front of the one or more cameras;
capture a first progress photograph of the user emulating the first athletic pose;
display a visual representation of a second athletic pose;
instruct the user to emulate the second athletic pose in front of the one or more cameras; and
capture a second progress photograph of the user emulating the second athletic pose;
a database for storing a user's fitness progress data including the progress photographs of the user received from the client device; and
a processor configured to:
receive, from the client device, the fitness progress data including the progress photographs in order to store the fitness progress data in a profile associated with the user; and
provide one or more mobile devices access to the fitness progress data via the GUI, wherein the GUI is configured to display a visual progress indicator comprising:
an initial fitness progress photograph of the user,
an initial weight value of the user,
a plurality of progress photographs of the user previously captured over a period of time,
a plurality of weight values of the user previously recorded over the period of time,
a current progress photograph of the user, and
a current weight of the user.

2. The server of claim 1, wherein the fitness progress data includes the user's weight.

3. The server of claim 1, wherein the fitness progress data includes the user's height.

4. The server of claim 1, wherein the fitness progress data includes the user's exercise routine.

5. The server of claim 1, further comprising a module for calculating a fitness analysis based on the fitness progress data.

6. The server of claim 5, wherein the fitness analysis comprises a body mass index of the user.

7. The server of claim 5, wherein the fitness analysis comprises a body fat percentage of the user.

8. The server of claim 1, further comprising a module for providing a graphical user interface to the second device.

9. The server of claim 1, further comprising a module for providing an advertising content from a third-party affiliate to the first device.

10. The server of claim 1, further comprising a module for providing an advertising content from a third-party affiliate to the second device.

* * * * *